Dec. 21, 1965 W. H. LAUER ET AL 3,224,209
PROCESS AND APPARATUS FOR PURIFYING AND SEPARATING
COMPRESSED GAS MIXTURES
Filed Jan. 28, 1960 3 Sheets-Sheet 1

Fig.1.

INVENTORS
WILBUR H. LAUER
OSCE P. ROBERTS, JR.
EDWARD F. YENDALL

BY *William F. Mesinger*
ATTORNEY

United States Patent Office

3,224,209
Patented Dec. 21, 1965

3,224,209
PROCESS AND APPARATUS FOR PURIFYING AND SEPARATING COMPRESSED GAS MIXTURES
Wilbur H. Lauer, Buffalo, Osce P. Roberts, Jr., Grand Island, and Edward F. Yendall, Buffalo, N.Y., assignors to Union Carbide Corporation, a corporation of New York
Filed Jan. 28, 1960, Ser. No. 5,293
5 Claims. (Cl. 62—14)

This invention relates to an improved process of and apparatus for purifying and separating compressed gas mixtures, and more particularly to improved process and apparatus for the separation of water and carbon dioxide impurities from compressed air prior to low temperature rectification of such air into air components.

Atmospheric air contains substantial quantities of water and carbon dioxide impurities, and unless these impurities are removed for example by chemical treatment of the air, or by adsorption therefrom, they will deposit as solid particles on the air side heat exchange surfaces as the air is cooled. This causes considerable difficulty, because if such deposition is continued the air side heat exchange surfaces become coated with thick layers of solid particles thus reducing heat transfer efficiency. Eventually these surfaces and passages will plug up completely, making the air separation process inoperative. One solution to this problem is to utilize duplicate heat exchangers piped in parallel so that a clogged heat exchanger may be thawed while the other is in use. However, such duplication is an expensive solution because the heat exchangers represent a major item of air separation plant investment cost.

In air separation plants employing relatively low air supply pressures, most of the water and carbon dioxide impurities are removed from the incoming air and deposited in a reversible heat exchange zone by heat exchange with outgoing air separation products. This zone may comprise heat exchangers of the cold accumulator or passage exchanging types. In order to avoid a buildup of ice and carbon dioxide solid particles in such heat exchange zone, the zone must be "self-cleaning." This means that all of the impurities deposited in the zone during an air intake stroke must be evaporated and swept out during the next succeeding product gas stroke. The self-cleaning condition may not be achieved by simply passing all of the outgoing product gas through the reversible heat exchange zone because compressed air, especially at low temperatures, has a substantially greater specific heat than the non-compressed air separation products, e.g. oxygen and nitrogen.

The prior art has devised many ways of alleviating this condition, one of which involves partially cooling the incoming air stream in the reversible heat exchange zone and depositing the water impurity in such zone. A minor portion of the partially cooled air stream is withdrawn from the zone and separately cleaned, while the major portion of the air stream is further cooled in the reversible heat exchange zone. Most of the major portion's carbon dioxide content is removed by deposition in such zone. Since by this arrangement, the volume of outgoing air separation products passing through the colder part of the zone is substantially greater than the volume of incoming air passing through this part, the reversible heat exchange zone can be made self-cleaning. One method of cleaning the diverted minor portion of partially cooled air, or "side-bleed," is to chill the latter well below the carbon dioxide deposition point by direct mixing with a portion of the further cooled or "cold end" air having passed through the entire length of the reversible heat exchange zone. This scheme has several important disadvantages. If direct mixing is used, local precipitation of carbon dioxide is likely to occur at the point of mixing, and a filter would be required to remove the solid particles. Also, if the colder air is mixed with the side-bleed air, a larger quantity of air must be processed by the filter, and a larger filter must be used to avoid a higher pressure drop. For control purposes, it is desirable to maintain the pressure drop in the side-bleed circuit as low as possible. Furthermore, to mix cold end air with the side-bleed air, the latter must be slightly throttled. This is because the undiverted air is subjected to additional pressure drop in passing through the colder part of the reversible heat exchange zone. As a result of the side-bleed throttling necessity, if any part of the carbon dioxide-free throttled side bleed air is to be bypassed to the cold end air stream, it was believed that the latter must also be slightly throttled to obtain flow in the desired direction. Throttling of the cold end air is undesirable as it substantially increases the air compression power costs.

Another problem connected with the side-bleed method of unbalancing a reversible heat exchange zone for self-cleaning is determining the temperature level for such side-bleeding. The ideal temperature range for side-bleeding accumulators or reversing passage exchangers is $-80°$ C. to $-120°$ C. There are several reasons for this selection as follows:

(1) The side-bleed air volume necessary for self-cleaning is less at warmer levels than at colder levels. For example, the required volume at the $-120°$ C. level is 30% to 40% greater than at the $100°$ C. level.

(2) A warmer side-bleed point avoids approaching too closely the level at which carbon dioxide begins to deposit, e.g. approximately $-134°$ C. for 75 p.s.i. air of normal $CO_2$ content. The safe margin for trouble-free operation of accumulators or reversing passage exchangers is substantially reduced by lowering the side-bleed level below about $-120°$ C.

(3) In the case of reversing passage exchangers, the units are normally available in standard lengths, and this conveniently fixes the temperature between the warm and cold units at approximately $-100°$ C. Withdrawing the side-bleed at a colder level would require remanifolding the complex passages at an intermediate point in the cold unit. Although this can be done, it adds appreciably to the cost of the exchangers.

One practical method of removing the carbon dioxide impurity from the air side-bleed is by gas phase adsorption using an adsorbent such as silica gel. In this manner the carbon dioxide may be removed while still in vapor phase, thereby avoiding the difficulties of solid precipitation. Unfortunately, the ideal temperature for side-bleeding the reversible heat exchange zone does not correspond with the ideal operating temperature range for a silica gel trap, the latter being $-120°$ C. to $-130°$ C. for air of normal $CO_2$ content and as low as $-135°$ C. for air of below normal $CO_2$ content. This range is advantageous because the capacity of silica get for absorbing carbon dioxide from air is considerably higher at lower temperatures.

A further problem arises if an air stream is to be expanded with the production of external work and low-temperature refrigeration. The side-bleed air is a convenient source of higher pressure gas for such work expansion, but either or both its temperature and volume may be unsuitable for such work expansion. For example, the optimum expansion turbine inlet temperature is about $-150°$ C. to $-155°$ C., which of course is substantially below either the optimum side-bleed or silica gel adsorption temperature. The turbine inlet temperature is selected so as to operate as cold as possible and yet avoid appreciable liquid condensation in the turbine discharge. The latter is undesirable as it produces erosion of the turbine blades and loss of efficiency. Also, the addition of colder air to the side-bleed air to obtain this optimum temperature level for the turbine will generally result in a larger volume of air than is desired for work expansion. The quantity of air to be work expanded is determined by a heat balance on the air separation cycle. It is undesirable to work expand more air than is required by the heat balance, because such excess air expansion would reduce the efficiency of the process and may require an oversized turbine.

Principal objects of the present invention are to provide a process and apparatus for purifying and separating compressed air utilizing a side-bleed for unbalancing the reversible heat exchange zone, means for removing the carbon dioxide impurity from the side-bleed, and means for work expanding at least part of the side-bleed, the steps and apparatus being arranged and related so that each step is conducted under ideal or optimum conditions, the overall result being a highly efficient and low cost system for separation of air into products or components.

These and other objects and advantages of this invention will be apparent from the following description and accompanying drawings in which:

FIG. 1 shows a flow diagram of a system for purifying an air stream and preparing a portion of such stream for work expansion, according to the present invention;

Figure 2:
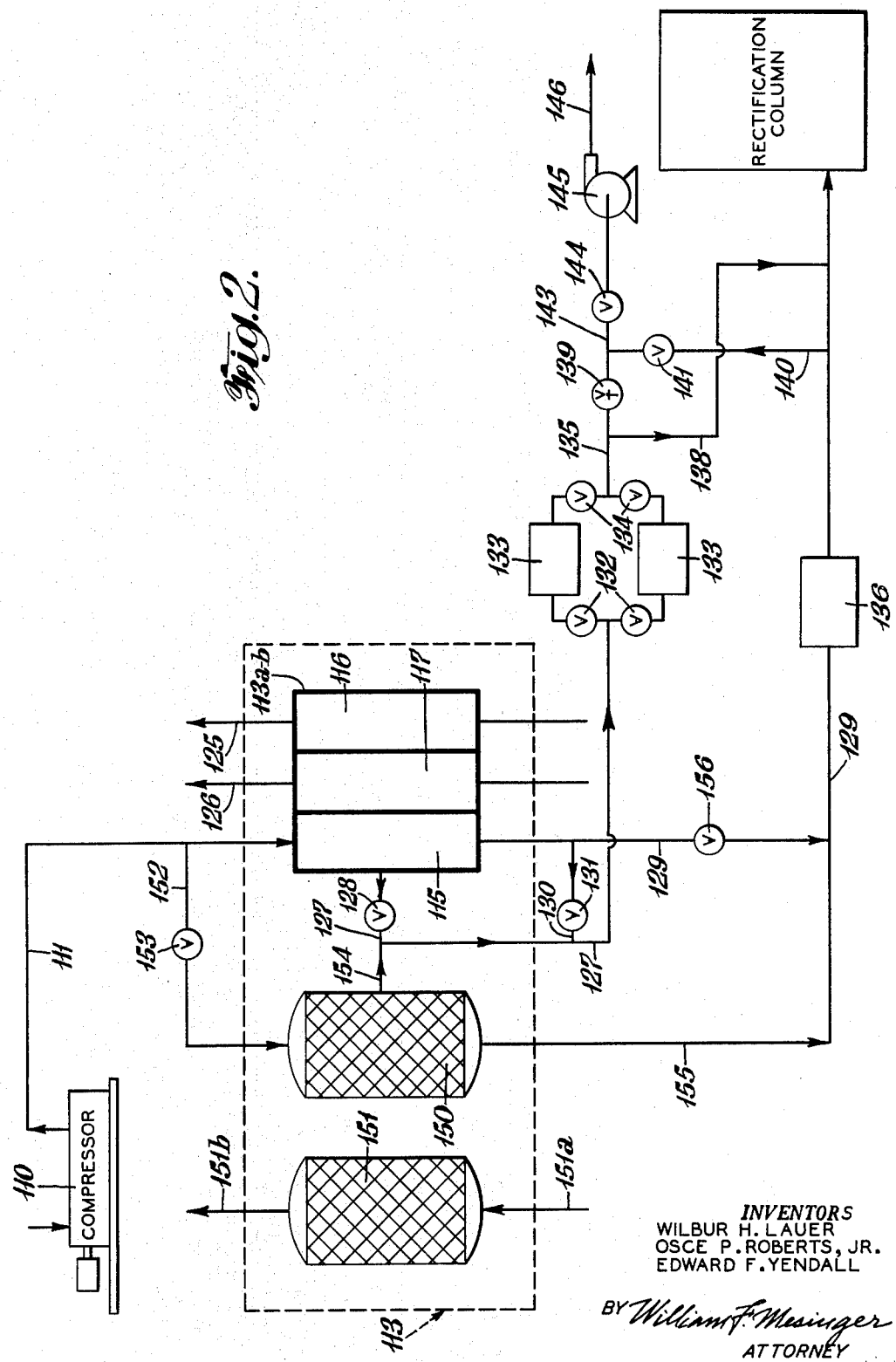
FIG. 2 is a flow diagram of a modified system according to the present invention.

It has been unexpectedly discovered that the side-bleed air stream may be cooled to a temperature of between $-120°$ C. and $-135°$ C. by direct mixing with clean cold end air without excessive carbon dioxide deposition. Under these circumstances, a maximum of 15% of the carbon dioxide in the side-bleed stream will be solidified downstream of the mixing point. It is believed that most of this solid carbon dioxide quickly resublimes, but even if none does, the total amount of solid carbon dioxide formed can be tolerated without plugging equipment downstream in the circuit. The lower temperatures in this range are feasible because of the diluting effect of the admixed clean air. This reduces the partial pressure of $CO_2$ in the mixed stream and correspondingly reduces the deposition temperature.

The present invention utilizes this discovery in combination with cross-mixing between the side-bleed and cold end air streams as disclosed and claimed in copending application Serial No. 677,606 filed August 12, 1957 now U.S.P. 2,984,079 in the name of L. C. Matsch et al. It will be noted that the previously referenced invention contemplates and solves a problem similar to the problem faced by present applicants. One advantage of the instant invention is that direct mixing between the side-bleed and cold end air streams eliminates the necessity for a heat exchanger for such streams.

More specifically in the present invention, an air stream at an inlet pressure below 150 p.s.i.g. is passed to a reversible heat exchange zone, partially cooled to a temperature between $-80°$ C. and $-110°$ C. for removal of the water impurity by deposition in such zone, and divided into major and minor portions. The major portion of the inlet air stream is further cooled to a temperature at least as low as $-170°$ C., and the minor or side-bleed portion is withdrawn from the zone. A first regulated part of the further cooled major portion is diverted and mixed with the minor portion, said part being of suitable quantity to form a combined stream having a temperature of between $-120°$ C. and $-135°$ C. The combined stream is then passed through an adsorbent zone for carbon dioxide removal therein.

A second gas mixture is then formed having suitable flow and temperature of between $-150°$ C. and $-155°$ C. for work expansion by: (a) diverting a regulated part of the warmer combined stream at $-120°$ C. to $-135°$ C. to the further cooled major portion or cold end air, and (b) the remaining undiverted part of the combined stream is slightly throttled and mixed with a second regulated part of the further cooled major portion so as to cool the former and form the work expansion inlet stream. The inlet stream is then expanded to a low pressure with the production of external work. At least part of the further cooled major portion of the air is passed to a rectification zone for separation into its components.

It will thus be apparent that this invention permits each step to be performed at its optimum temperature range, the overall result being a highly efficient and economical method of obtaining air separation products such as oxygen and nitrogen. For example, the reversible heat exchange zone is side-bled at its optimum temperature level of $-80°$ C. to $-110°$ C., the side-bleed adsorption traps are operated at $-120°$ C. to $-135°$ C. for maximum adsorptive efficiency, and the work expansion step is performed with an air stream of optimum quantity and air inlet temperature of $-150°$ C. to $-155°$ C.

It is to be understood that the reversible heat exchange zone employed herein may comprise accumulative-type heat exchangers or passage exchanging heat exchangers or a combination thereof. Both types are well-known to those skilled in the art, cold accumulators and their operation being described in U.S. Patent 1,890,646 to M. Frankl, and passage exchanging units being described in U.S. Patent 2,460,859 to P.R. Trumpler.

In an air separation plant, it is usually more economical to use passage exchanging heat exchangers rather than embedded coil type accumulators for the production of clean products streams uncontaminated by water and carbon dioxide impurities. However, simple accumulators (without embedded coils) are usually more economical than passage exchanging units. Thus, use of a combination of simple accumulators and passage exchanging units would logically be a desirable arrangement whenever the production of clean product streams is required. One problem in such a combination when side-bleeding is to be employed, is that the optimum side-bleed temperature may not be the same for both types of heat exchangers. For example, problems of flow maldistribution in accumulator design may make it desirable to locate the side-bleed takeoff at a relatively warm level such as $-80°$ C. to $-100°$ C. In contrast, with passage exchanging heat exchangers, the units are commercially available in standard length cores. It is more economical to use two equal length standard cores and side-bleed at $-90°$ C. to $-110°$ C. with subsequent cooling by other means than to use shorter cores for the cold legs and side-bleed at colder temperatures.

Accordingly, one embodiment of the present invention contemplates employing both accumulator and passage exchanging units in the reversible heat exchange zone, and side-bleeding each unit at its optimum temperature. The side bleed streams are combined and then mixed with sufficient further cooled or cold end air to form a gas mixture at $-120°$ C. to $-135°$ C. The latter is then passed through an adsorption zone and processed in the previously described manner. This premixing step ahead of the adsorption zone provides unexpected advantages with the combination type reversible heat exchange zone, since it may be performed without throttling the cold end air stream. The combination provides a source of relatively higher pressure cold end air which may be introduced directly into the side-bleed stream. It has been found that the air pressure drop through passage exchanging type heat exchangers is smaller than through the accumulator type exchangers. This pressure differential has been found sufficient to introduce cold end air from passage exchanging type heat exchangers into the combined side-bleed stream so that the increased air compression costs of throttling the cold end air are thus avoided.

Referring now to the drawings and particularly to FIG. 1, air is compressed in compressor 10 to a pressure of less than 150 p.s.i.g. and preferably about 75 p.s.i.g., and the heat of compression may be removed by, for example, a water cooled exchanger (not shown). The compressor discharge air stream passes through conduit 11 and reversing valves 12 to a reversible heat exchange zone 13, which may comprise cold accumulators or passage exchanging heat exchangers, but is illustrated as the latter. Zone 13 comprises warm leg 13a and cold leg 13b, and the air stream is cooled by heat exchange with air separation products such as nitrogen and oxygen. Each leg comprises two reversing passageways and one non-reversing passageway, these being reversing passageways 15 and 16, and non-reversing passageway 17 in warm leg 13a, and communicating passageways 18–20 in cold leg 13b. As illustrated, the inlet air stream is partially cooled in reversing passageway 15, and a major part thereof is conducted through conduit 21 to reversing passageway 18 of cold leg 13b for further cooling therein to at least $-170°$ C.

The nitrogen and oxygen rectification products separated from the air mixture in a distillation column (not shown) are supplied to conduits 22 and 23, respectively, at the cold end of cold leg 13b. The cold nitrogen product is introduced through reversing valve 24 into reversing passageway 19 and communicating reversing passageway 16 for flow therethrough in countercurrent heat exchange with the inlet air. The cold oxygen product flows consecutively through non-reversing passageways 20 and 17, also in countercurrent heat exchange with the inlet air. It is to be noted that the air and nitrogen flows are periodically switched between the reversing passageways, so that the nitrogen also serves to remove the previously deposited water and carbon dioxide impurities. Thus, the warmed nitrogen gas discharged through reversing valves 12 and conduit 25 is contaminated with impurities. On the other hand, the oxygen product emerges through conduit 26 in the impurity-free state. Reversing valves 12 and 24 are suitably connected to each other and to the zone 13 in order to achieve this cyclic heat exchange which will be fully understood by those skilled in the art.

The water content of the inlet air stream is removed by deposition in the warm leg 13a of the reversible heat exchange zone 13, and such stream is divided into major and minor portions by withdrawing a minor portion or side-bleed at a temperature of $-80°$ to $-110°$ C. and preferably between about $-90°$ C. and $-110°$ C. through conduit 27 and valve 28 therein. The side-bleed air may constitute approximately 3% to 15% of the total inlet air stream and preferably about 10%. One purpose of the side-bleed is to bypass a sufficient portion of the inlet air stream around the colder part of the reversing heat exchange zone 13 so that the flow ratio of outgoing air separation products to inlet air will be sufficiently increased to achieve a self-cleaning temperature pattern in the zone 13. As previously discussed, the side-bleed air is withdrawn at the $-80°$ C. to $-110°$ C. level instead of a lower temperature level to minimize the side-bleed flow and positively avoid carbon dioxide deposition in the heat exchange zone 13 above the side-bleed level.

The further cooled air is discharged from cold leg 13b through reversing valves 24 into conduit 29, and a first part thereof is diverted through branch conduit 30 and control valve 31 therein. The diverted part is mixed with the side-bleed stream in conduit 27 to form a composite stream, the diverted part being of sufficient quantity to provide a composite stream temperature of $-120$ to $-135°$ C. as previously discussed, this is the optimum temperature range for silica gel adsorption of carbon dioxide from 75 p.s.i.g. air which still provides a safe margin above the deposition point of carbon dioxide at this pressure. At these conditions, carbon dioxide begins depositing from normal air approximately $-134°$ C., but somewhat lower temperatures are permissible in this invention due to the diluting effect of the clean, cold end air. If the side-bleed air were cooled appreciably below about $-135°$ C., it is probable that excessive carbon dioxide deposition would occur. The composite stream is passed through conduit 27 and inlet valves 32 into one or the other of a pair of the adsorbent traps 33 for removal of the vapor phase carbon dioxide by silica gel adsorption. These gel traps are provided in duplicate and piped in parallel for alternate operation so that when one gel trap becomes loaded with carbon dioxide, the side-bleed air may be diverted to the other gel trap having previously been purged and reactivated by means not illustrated. As previously discussed, it is preferable to conduct the adsorption step at relatively low temperatures, such as $-120°$ C. or lower, because the carbon dioxide adsorptive capacity of silica gel is higher at lower temperatures. The carbon dioxide-free side-bleed air emerges through silica gel trap discharge valves 34 into conduit 35.

Meanwhile the undiverted part of the major portion of the inlet air stream in conduit 29 is preferably passed through cold end adsorbent trap 36 for filtration and adsorption of any residual carbon dioxide not previously removed. It will be noted that the previously discussed first part of the further cooled air may alternatively be diverted from conduit 29 through branch conduit 37 and control valve 37a, downstream instead of upstream of cold end adsorption trap 36. An air stream having suitable flow and temperature of between $-150$ and $-155°$ C. for work expansion is formed by first diverting a regulated part e.g. 60% of the cleaned, combined stream from conduit 35 through branch conduit 38 to the undiverted part of the major portion in conduit 29. At least part of the cold air mixture in conduit 29 is then passed to a rectification column (shown in block form) for separation into air components in a manner well-known to those skilled in the art. For example, the rectification column may contain special sieve-type trays for effecting intimate contact between the rising vapor and descending liquid.

The remaining undiverted part of the combined stream is slightly throttled through valve 39, and mixed with a second regulated part of the further cooled undiverted major portion, said part having itself been diverted through conduit 40 and control valve 41 therein. In this particular embodiment of the invention, the last-mentioned portion is diverted from conduit 29 upstream of valve 42 which controls the relative quantities of diverted and undiverted parts. The mixture of the undiverted combined stream in conduit 35 and the second diverted part of the further cooled air in conduit 40, comprise the work expansion inlet stream in conduit 43, the quantity of which is regulated by valve 44. In this manner, an expander inlet stream is formed being of suitable quantity and having a temperature of $-150$ to $-155°$ C., so as to achieve optimum work expansion conditions. The inlet stream in conduit 43 enters turbine 45 for work expansion therein to about 3 p.s.i. and $-183°$ C. The turbine discharge stream in conduit 46 may either be passed to the rectification column for separation into air components, or united with the portion of these components passing to the reversible heat exchange zone 13 for cooling and partially cleaning the inlet air therein. A further possibility is dividing the work expanded side-bleed air so that a part thereof may be directed to each of the aforementioned points. In any event, this stream contains a substantial quantity of refrigeration, and the cycle efficiency is greatly improved when such refrigeration is recovered.

It will be apparent from the foregoing description that this invention offers important advantages over prior art side-bleed schemes. For example, either accumulators or passage exchanging heat exchangers can be side-bled at their optimum temperature levels independent of the requirements of the side-bleed adsorption traps. Also, direct mixing of the side-bleed and cold end air streams permits control of the combined stream temperature into the adsorption traps independent of the reversible heat exchange zone side-bleed temperature. This means that the adsorption traps may be operated at optimum temperature, which is the lowest permissible temperature above the carbon dioxide deposition range. Such lower temperature permits the highest adsorbent loading with carbon dioxide so that the adsorbent trap can be made smaller and/or the trap "life" between reactivations can be longer.

A further advantage accrues in view of the fact that when employing passage exchanging units, the side-bleed temperature will warm up in the summer due to the increased moisture content of the inlet air. The direct mixing step upstream of the side-bleed adsorption traps permits suitable flow adjustments to be made so that operation of these traps remains optimized over a considerable range of plant operating conditions without adversely affecting the performance of the other component equipment.

Furthermore, the cross-mixing feature downstream of the side-bleed adsorption traps produces optimum work expansion conditions by requiring less throttling of the side-bleed stream. This permits highly efficient expander operation by preserving the maximum pressure differential available for producing refrigeration by work expansion.

It was noted that FIG. 1 embodiment requires slight throttling of the cold end air through valve 42. This disadvantage can be more readily tolerated in a passage exchanging heat exchanger plant, since the direct mixing step avoids the necessity of a heat exchanger to cool the side-bleed air. The invention is somewhat less advantageously employed in cold accumulator equipped plants. If cold end air is added from accumulators to cool the side-bleed streams, more throttling is required in the side-bleed stream to permit the injection of cold end air. This greater degree of throttling reduces the expander inlet pressure differential available for producing refrigeration.

Referring now to the embodiment illustrated in FIG. 2, the features which are similar to those shown in FIG. 1 are designated by similar reference numerals. The process and apparatus differ in certain particulars in that both cold accumulators and passage exchanging heat exchangers are employed in the reversible heat exchange zone 113. More specifically, a pair of cold accumulators 150 and 151 are provided and piped in parallel for alternate operation so that when one unit is on air input the other unit is on product outflow and being regenerated. Suitable piping and valving to effect this cyclic operation have not been illustrated in the interest of simplicity, such operation being well-understood by those skilled in the art, and described in detail in the previously referenced U.S.P. 1,890,646 to M. Frankl. In cold accumulators, the air stream is cooled through an intermediate refrigeration storage means such as regenerative packing, whereas in the passage exchanging units, the air stream is cooled by heat exchange with a colder fluid in an adjacent passageway.

The inlet air stream in conduit 111 is divided into two parts, one part being directed through conduit 152 and control valve 153 to on-stream accumulator 150 for cooling and cleaning therein. The first part is partially cooled therein to a temperature level between $-80°$ C. and $-110°$ C., and preferably between $-80°$ C. and $-100°$ C. A minor portion is diverted therefrom through conduit 154 as a side-bleed stream, while the major portion of the inlet air stream is further cooled to at least $-170°$ C., and withdrawn from the cold end of accumulator 150 and conduit 155. Simultaneously, cold accumulator 151 is being regenerated by passage of an air separation product, e.g. nitrogen, through the packed bed. Such purge gas is introduced to the cold end of accumulator 151 through conduit 151a, and the resulting water and carbon dioxide-ladened, warmed purge gas is discharged from the warm end through conduit 151b for discharge to the atmosphere or further use as desired.

The second part of the warm inlet air stream is directed through conduit 111 to reversing passageway 115 of passage exchanging heat exchanger 113a–b, the latter operating in a manner analogous to exchangers 13a and 13b of FIG. 1. Again in the interest of simplicity, the exchanger has been illustrated as one unit instead of the commonly used separate warm and cold legs. The side-bleed stream is preferably withdrawn from exchanger 113a–b through conduit 127 containing control valve 128 therein at a temperature level of $-90°$ to $110°$ C., and mixed with the cold accumulator side-bleed stream from conduit 154 to form a composite side-bleed stream.

As previously discussed, the pressure drop through passage exchanging heat exchangers is usually slightly less than through cold accumulators, and the present invention utilizes this characteristic to obtain the desired mixing between cold end air and side-bleed air without throttling the cold end air and hereby avoiding its attendant power losses. To accomplish this, a regulated part of the exchanger 113a–b cold end air is diverted from conduit 129 through branch conduit 130 and control valve 131 therein, and mixed with the combined side-bleed stream in conduit 127 so as to cool the latter to the optimum adsorption temperature level of $-120$ to $-135°$ C.

It should be noted that in this particular embodiment, which combines both accumulators and passage exchangers, the present invention can be employed beneficially even though the side-bleed level for certain of the heat exchange units is at a temperature lower than the range $-80°$ C. to $-110°$ C. For example, the accumulators may, if desired, be operated with a side-bleed temperature of $-120°$ C., and upon mixing this stream with side-bleed at perhaps $-100°$ C. from the passage exchanging units, a combined side-bleed stream at intermediate temperature is obtained. Intermixing cold end air prior to the adsorption step will be beneficial whenever the intermediate temperature of the combined stream is substantially above the optimum temperature for adsorption.

The undiverted part of the exchanger 113a–b cold end air in conduit 129 is passed through control valve 156 therein, and mixed with the slightly lower pressure cold end air from cold accumulator 150 in conduit 155. The combined further cooled air stream in conduit 129 and the combined, adjusted side-bleed stream in conduit 143 are processed in a manner analogous to that previously described in conjunction with FIG. 1. It will be noted, however, that a throttling valve analogous to valve 42 is not required in the FIG. 2 embodiment for previously stated reasons.

Figure 3:
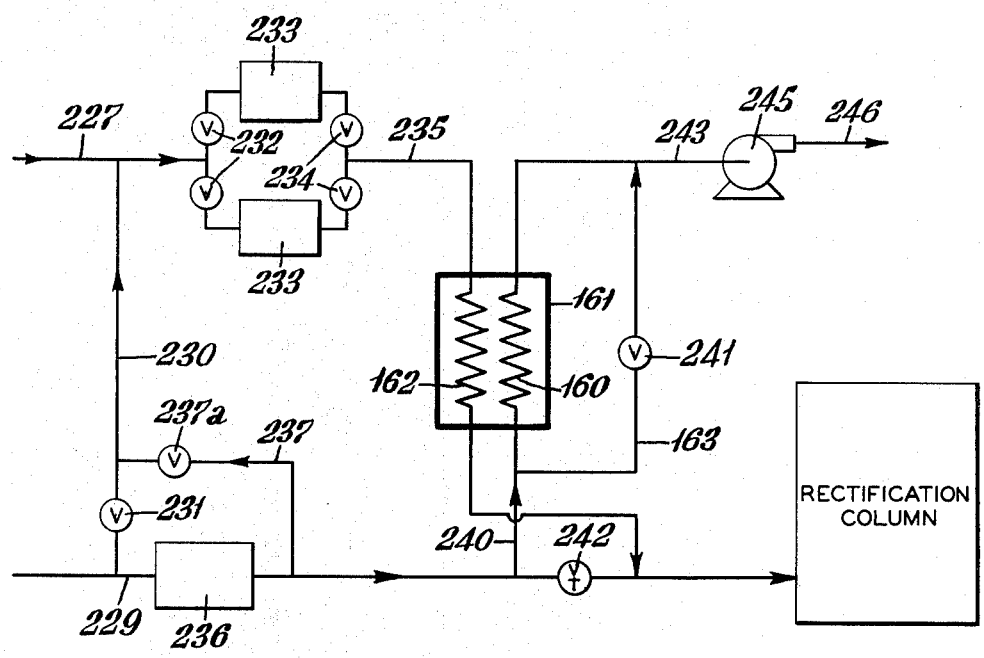
FIG. 3 is a flow diagram of another system similar to those of FIGS. 1 and 2, but modified to include a heat exchange between the cold end and side-bleed air.

Still another embodiment of the invention is illustrated in FIG. 3, and again features similar to these shown in FIGS. 1 and 2 are identified by similar reference numerals. The heat exchange zone portion of the FIG. 1 embodiment located on the left side of the dotted line is also employed in the FIG. 3 system. Referring now more specifically to the latter, the side-bleed stream in conduit 227 is mixed with a regulated part of the cold end air from conduit 230, and the composite stream having a temperature of $-120$ to $-135°$ C. is cleaned in the adsorption traps 233. A second part of the further cooled air stream in conduit 229 is diverted therefrom through conduit 240 and further divided into two portions. A first portion is directed through passageway 160 of heat exchanger 161 in countercurrent relation with the composite, cleaned side-bleed stream in passageway 162, thereby cooling the latter. The warmed first portion of cold end air is mixed with the second portion having by-passed heat exchanger 161 by flow through conduit 163 having control valve 241 therein. The mixture of the two portions in conduit 243 forms the work expander inlet stream which is expanded through turbine 245 with the production of low-temperature refrigeration. The recooled composite side-bleed stream is discharged from passageway 162, and mixed with the undiverted, further cooled air stream in conduit 229 for passage to the rectification column.

Although preferred embodiments of the invention have been described in detail, it is contemplated that modifications of the process and the apparatus may be made and that some features may be employed without others, all within the spirit thereof as set forth herein.

What is claimed is:

1. A process for preparing a compressed gas mixture containing water and carbon dioxide impurities for low temperature rectification of the gas into its components comprising the steps of providing a gas mixture stream at an inlet pressure below 150 p.s.i.; dividing said gas mixture stream into two parts, passing one part to a reversing heat exchange zone comprising at least two accumulator-type heat exchange zones arranged in alternating flow sequence, passing the other part to another reversing heat exchange zone comprising at least one passage exchanging zone, partially cooling each of the two parts of the mixture separately in said heat exchangers to temperatures between $-80°$ C. and $-110°$ C. and removing the water impurity by deposition in the heat exchangers; dividing each part of the partially cooled mixture into major and minor portions; withdrawing the two patrially cooled minor portions from said heat exchangers with at least one of said two minor portions being withdrawn at a temperature between $-80°$ C. and $-110°$ C., mixing the two partially cooled minor portions to form a single partially cooled minor portion; further cooling the major portions of each part of said gas mixture stream in said two heat exchangers to a temperature at least as low as $-170°$ C.; diverting a regulated first part of the further cooled major portion from the cold end of the passage exchange heat exchanger and mixing such part with the combined partially cooled minor portions, said first part being of suitable quantity to form a combined stream having a temperature between $-120°$ C. and $-135°$ C., passing said new combined stream through an adsorbent zone for carbon dioxide removal by substantially all vapor phase adsorption therein; forming a gas mixture stream having suitable flow and temperature of between $-150°$ C. and $-155°$ C. for work expansion by diverting a regulated part of the warmer combined stream to the further cooled and combined major portion withdrawn from the accumulator-type heat exchange and the undiverted part of the major portion withdrawn from the passage exchanger, slightly throttling the remaining undiverted part of said warmer combined stream, diverting a regulated second part of said further cooled and combined major portions and mixing such further cooled second part with the slightly throttled undiverted part of the combined warmer stream so as to cool such stream thereby forming the work expansion inlet stream; expanding such inlet stream to a low pressure with production of external work; and passing at least part of the remaining undiverted further cooled and combined major portions of said compressed gas mixture to a rectification zone for separation into its components.

2. A process in accordance with claim 1 wherein said minor portion is withdrawn from the accumulator-type heat exchange zones at temperatures between $-80$ and $-120°$ C.

3. A process in accordance with claim 1 wherein said minor portion is withdrawn from the passage exchanging zone at temperatures between $-90$ and $-110°$ C.

4. A process in accordance with claim 1 wherein said minor portion is withdrawn from the accumulator-type heat exchange zones and the passage exchanging zone at temperatures respectively between $-80$ and $-120°$ C., and $-90$ to $-110°$ C.

5. Apparatus for the separation of water and carbon dioxide impurity-containing air by low temperature rectification including a rectifying device; means by which inlet air is supplied at a pressure below 150 p.s.i.; a reversible heat exchange zone comprising at least one passage exchanging heat exchanger and a pair of accumulator-type heat exchangers arranged in alternating flow sequence, means for dividing the compressed air feed stream into two parts and passing such parts to said passage exchanging heat exchanger and an accumulator-type heat exchanger for separate partial cooling thereof to a temperature between $-80°$ C. and $-110°$ C. so that the water impurity is deposited in said zones, means for withdrawing and mixing together minor portions of the partially cooled parts from each heat exchanger after such partial cooling to form a combined partially cooled minor portion, means for further cooling the major, unwithdrawn portions of said air inlet stream in said reversible heat exchange zones to a temperature at least as low as $-170°$ C. so that most of the carbon dioxide impurity is deposited therein; means for diverting a regulated first part of the further cooled air withdrawn from the cold end of the passage exchanging heat exchanger and mixing such first part with said partially cooled minor portions so as to form a combined stream having a temperature of between $-120°$ C. and $-135°$ C.; means comprising an adsorption trap for vapor phase removal of carbon dioxide impurity from said combined stream; means for forming an air stream having suitable flow and temperature of between $-150°$ C .and $-155°$ C. for work expansion comprising means for diverting a regulated part of the warmer combined stream to the further cooled and combined major portions withdrawn from the cold ends of the reversible heat exchange zone exchangers, means for slightly throttling the remaining undiverted part of said combined stream withdrawn from the adsorption trap, means for diverting a regulated second part of said further cooled and combined major portion and mixing such second part with the warmer, slightly throttled undiverted part of said combined stream so as to cool said such stream thereby forming the work expansion inlet stream; means comprising a work expander for expanding such inlet stream with the production of external work; means for passing at least part of the remaining, undiverted further cooled combined major portion to said rectifying device for separation into air components; and means for passing at least part of the separated air components through the reversible heat exchange zone to evaporate and discharge the previously deposited air impurities from the heat exchangers in such zone.

References Cited by the Examiner

UNITED STATES PATENTS

| | | | |
|---|---|---|---|
| 1,831,644 | 11/1931 | Adair | 62—18 X |
| 2,633,931 | 4/1953 | Schneider. | |
| 2,655,796 | 10/1953 | Rice | 62—14 |
| 2,699,047 | 1/1955 | Karwat et al. | 62—18 X |
| 2,753,698 | 7/1956 | Jakob | 62—18 X |
| 2,825,212 | 3/1958 | Linde | 62—18 |
| 2,827,775 | 3/1958 | Linde | 62—13 |
| 2,827,776 | 3/1958 | Karwat | 62—13 |
| 2,835,115 | 5/1958 | Karwat | 62—18 X |
| 2,862,819 | 12/1958 | Hougen | 62—20 X |
| 2,984,079 | 5/1961 | Matsch | 62—14 |

FOREIGN PATENTS 1,229,209  3/1960  France.

NORMAN YUDKOFF, *Primary Examiner.*

GEORGE D. MITCHELL, ROBERT A. O'LEARY, EDWARD J. MICHAEL, *Examiners.*